US012665326B2

(12) United States Patent
Clingman et al.

(10) Patent No.: US 12,665,326 B2
(45) Date of Patent: Jun. 23, 2026

(54) CONDUCTOR INSULATION ANCHORING SYSTEM

(71) Applicant: Baker Hughes Oilfield Operations LLC, Houston, TX (US)

(72) Inventors: James Christopher Clingman, Broken Arrow, OK (US); Nicholas William Pond, Broken Arrow, OK (US); Spencer Wilcox, Claremore, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 432 days.

(21) Appl. No.: 18/133,421

(22) Filed: Apr. 11, 2023

(65) Prior Publication Data

US 2023/0327349 A1 Oct. 12, 2023

Related U.S. Application Data

(60) Provisional application No. 63/329,883, filed on Apr. 11, 2022.

(51) Int. Cl.

| | |
|---|---|
| ***H01R 11/28*** | (2006.01) |
| ***E21B 43/12*** | (2006.01) |
| ***H01B 7/00*** | (2006.01) |
| ***H01B 7/26*** | (2006.01) |
| *H01R 4/18* | (2006.01) |
| *H01R 4/2406* | (2018.01) |
| *H01R 4/30* | (2006.01) |
| *H01R 4/48* | (2006.01) |
| *H01R 4/70* | (2006.01) |

(52) U.S. Cl.

CPC ............ *H01R 11/28* (2013.01); *E21B 43/128* (2013.01); *H01B 7/0009* (2013.01); *H01B 7/26* (2013.01); *H01R 4/183* (2013.01); *H01R 4/2406* (2018.01); *H01R 4/30* (2013.01); *H01R 4/48* (2013.01); *H01R 4/70* (2013.01)

(58) Field of Classification Search

CPC ...... H01R 11/28; H01R 13/523; E21B 43/128
USPC .......................................... 166/66.4; 439/865
See application file for complete search history.

(56) References Cited

U.S. PATENT DOCUMENTS

| | | | | |
|---|---|---|---|---|
| 4,781,615 | A | 11/1988 | Davis | |
| 4,859,200 | A | 8/1989 | Mcintosh | |
| 6,145,597 | A * | 11/2000 | Kobylinski ........... | E21B 17/003 166/384 |

(Continued)

OTHER PUBLICATIONS

International Search Report and Written Opinion for PCT/US2023/018198 mailed Jul. 28, 2023.

*Primary Examiner* — Tulsidas C Patel
*Assistant Examiner* — Thaslimur Rahman
(74) *Attorney, Agent, or Firm* — Baker Hughes Company

(57) ABSTRACT

The unintended retraction of extruded insulation from a conductor causes reliability and safety concerns. A variety of insulation lock mechanisms are designed to prevent the insulation layer of an insulated lead from retracting and exposing uninsulated portions of the conductor. The insulation lock mechanism can be included between the conductor and the insulation layer, or included in a connector used to provide an electrical connection between an internal motor lead and an insulated lead of a motor lead cable. Within the connector, the insulation lock mechanism can be included between the insulation layer and a terminal that electrically connects the motor lead to the insulated lead.

15 Claims, 7 Drawing Sheets

(56) References Cited

U.S. PATENT DOCUMENTS

| | | | | |
|---|---|---|---|---|
| 2002/0013093 | A1 | 1/2002 | Wilbourn | |
| 2006/0148304 | A1 | 7/2006 | Kennedy | |
| 2009/0269956 | A1* | 10/2009 | Frey | H01R 13/533<br>439/275 |
| 2012/0118633 | A1 | 5/2012 | Warner | |
| 2015/0126056 | A1 | 5/2015 | Morita | |
| 2021/0218192 | A1* | 7/2021 | Yuratich | H02K 5/225 |
| 2022/0056767 | A1* | 2/2022 | Part | E21B 17/0285 |

* cited by examiner

CONDUCTOR INSULATION ANCHORING SYSTEM

RELATED APPLICATIONS

The present application claims the benefit of U.S. Provisional Patent Application Ser. No. 63/329,883 filed Apr. 11, 2022 and entitled "Conductor Insulation Anchoring System," the disclosure of which is herein incorporated by reference.

FIELD OF THE INVENTION

The present invention relates generally to insulated conductors used in electric motors, and more particularly to systems and methods for preventing the retraction of the insulation layer surrounding the conductor.

BACKGROUND

Submersible pumping systems are often deployed into wells to recover petroleum fluids from subterranean reservoirs. Typically, a submersible pumping system includes a number of components, including an electric motor coupled to one or more high performance pump assemblies. Production tubing is connected to the pump assemblies to deliver the petroleum fluids from the subterranean reservoir to a storage facility on the surface.

The motor is typically an oil-filled, high capacity electric motor that can vary in length from a few feet to nearly one hundred feet, and may be rated up to hundreds of horsepower. Typically, electricity is generated on the surface and supplied to the motor through a heavy-duty power cable. The power cable typically includes several separate conductors that are individually insulated within the power cable. Power cables are often constructed in round or flat configurations.

In many applications, power is conducted from the power cable to the motor via a "motor lead extension" or "motor lead cable." Motor lead extensions are often constructed in a "flat" configuration for use in the limited space between downhole equipment and the well casing. The motor lead extension typically includes one or more "leads" that are configured for connection to a mating receptacle on the motor. The leads from the motor lead extension are often retained within a motor-connector that is commonly referred to as a "pothead." The pothead relieves the stress or strain realized between the motor and the leads from the motor lead extension.

Each lead includes an electric conductor that is surrounded with one or more insulation layers. A distal portion of the insulation layer is removed to reveal the uninsulated (bare) conductor, which is typically captured in a terminal within the pothead. The terminal makes the connection between the lead from the motor lead cable (or power cable) and the conductor that connects to the coils in the motor.

In most cases, the insulation layer is extruded over the conductor during manufacture. The strain imposed during the extrusion process gradually relaxes, which may cause the insulation layer to axially retract from the conductor. The retraction of the insulation layer can be exacerbated by thermal cycles, which are common in motors that are installed in oil and gas wells. If the insulation layer retracts too far, the uninsulated conductive portion of the lead may short to another lead or a conductive component of the pothead or motor. Accordingly, there is a need for an improved system for discouraging the retraction of the insulation layer in leads within the pothead connector. It is to these and other deficiencies in the prior art that exemplary embodiments of the present invention are directed.

SUMMARY OF THE INVENTION

In one aspect, embodiments of the present disclosure are directed to a pumping system for use in recovering wellbore fluids from a wellbore. The pumping system includes an electric motor that has a motor lead, a motor lead cable that has an insulated lead with a conductor and an insulation layer, a pothead connector between the motor and the motor lead cable, where the pothead connector has terminal that electrically connects the motor lead to the insulated lead, and an insulation lock mechanism for preventing the retraction of the insulation layer from the conductor on the insulated lead.

In other embodiments, the present disclosure is directed at an insulated lead that includes a conductor and an insulation layer surrounding part of the conductor. The insulated lead also includes an insulation lock configured to prevent the retraction of the insulation layer from the conductor.

In yet other embodiments, the present disclosure provides a connector for connecting a motor lead to an insulated lead, where the insulated lead includes a conductor, an insulation layer surrounding a part of the conductor, and an uninsulated tip in which the conductor is not surrounded by the insulation layer. The connector includes a terminal that electrically connects the motor lead to the conductor of the insulated lead. The terminal includes an inner conductor counterbore configured to receive the uninsulated tip of the insulated lead, an outer insulator counterbore configured to receive a portion of the insulation layer of the insulated lead, and an insulation lock within the outer insulator counterbore for preventing the retraction of the insulation layer from the conductor on the insulated lead.

WRITTEN DESCRIPTION

Figure 1:
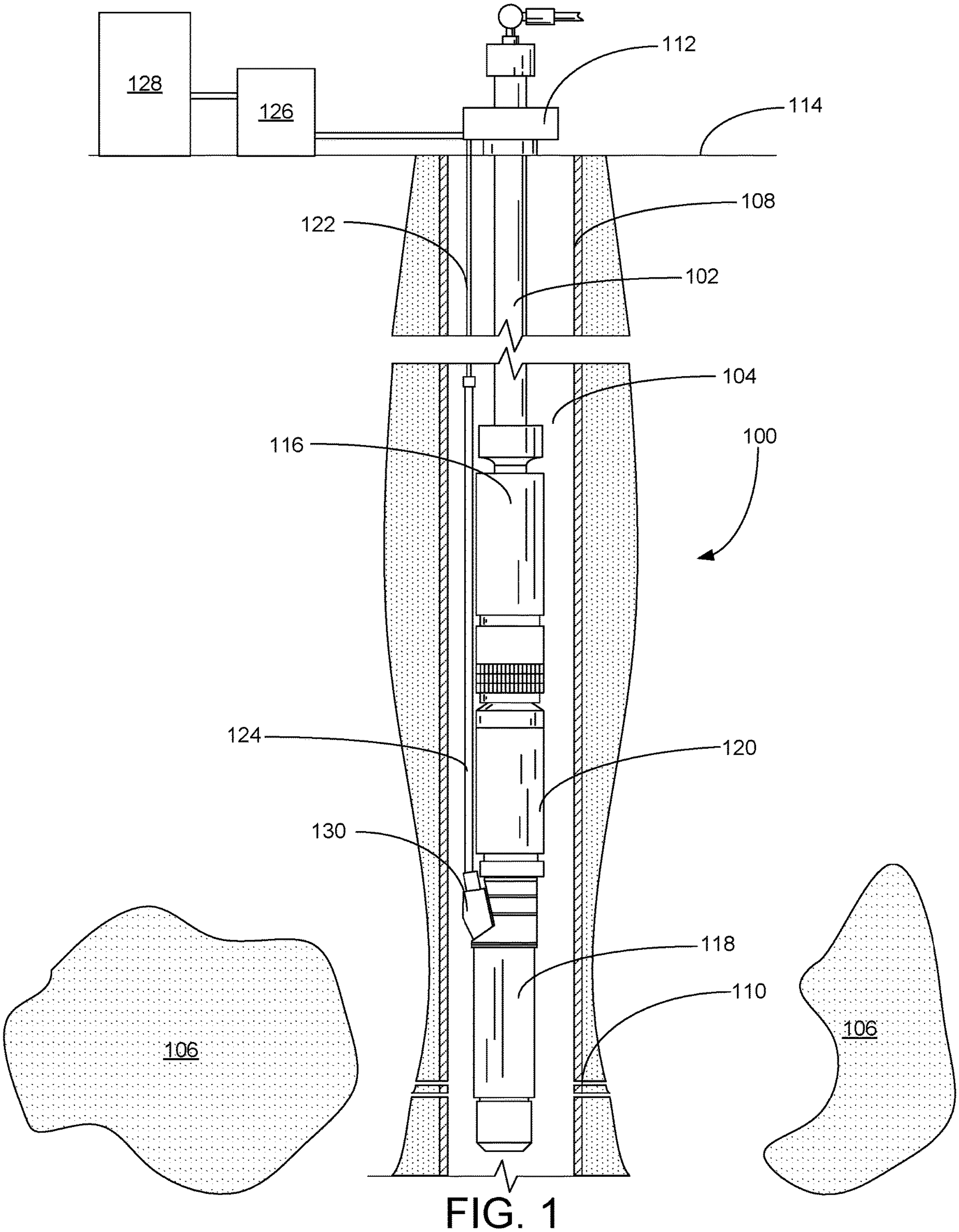
FIG. 1 depicts a submersible pumping system constructed in accordance with exemplary embodiments.

In accordance with an exemplary embodiment of the present invention, FIG. 1 shows a front view of a downhole pumping system 100 attached to production tubing 102. The downhole pumping system 100 and production tubing 102 are disposed in a wellbore 104, which is drilled for the production of a fluid such as water or petroleum from a subterranean geologic formation 106.

The wellbore 104 includes a casing 108, which has perforations 110 that permit the exchange of fluids between the wellbore 104 and the geologic formation 106. One or more packers 112 or other zonal isolation devices can be used to separate various segments or stages within the wellbore 104. Although the downhole pumping system 100 is depicted in a vertical well, it will be appreciated that the downhole pumping system 100 can also be used in horizontal, deviated, and other non-vertical wells. Accordingly, the terms "upper" and "lower" should not be construed as limiting the disclosed embodiments to use in vertical wells. The terms "upper" and "lower" are simply intended to provide references to components that are closer to a wellhead 114 on the surface ("upper") or closer to the perforations 110 and terminal end of the wellbore 104 ("lower").

The production tubing 102 connects the pumping system 100 to the wellhead 114. Although the pumping system 100 is primarily designed to pump petroleum products, it will be understood that the present invention can also be used to move other fluids. It will also be understood that, although each of the components of the pumping system 100 are primarily disclosed in a submersible application, some or all of these components can also be used in surface pumping operations.

The pumping system 100 includes a pump 116, a motor 118 and a seal section 120. The motor 118 converts electrical energy into mechanical energy, which is transmitted to the pump 116 by one or more shafts. The pump 116 then transfers a portion of this mechanical energy to fluids from the wellbore 104, causing the wellbore fluids to move through the production tubing 102 to the wellhead 114. In some embodiments, the pump 116 is a turbomachine that uses one or more impellers and diffusers to convert mechanical energy into pressure head. In other embodiments, the pump 116 is a progressive cavity (PC) or positive displacement pump that moves wellbore fluids with one or more screws or pistons.

The seal section 120 shields the motor 118 from mechanical thrust produced by the pump 116. The seal section 120 is also configured to prevent the introduction of contaminants from the wellbore 104 into the motor 118. Although only one pump 116, seal section 120 and motor 118 are shown, it will be understood that the downhole pumping system 100 could include additional pumps 116, seal sections 120 or motors 118. It will be appreciated that in some embodiments, the seal section 120 is not used or is incorporated within another component in the pumping system 100 (e.g., the motor 118 or the pump 116).

The motor 118 receives power from a surface-based supply through a power cable 122 and one or more motor lead extensions 124. In many embodiments, the power cable 122 and motor lead extensions 124 are configured to supply the motor 118 with three-phase electricity from a surface-based variable speed (or variable frequency) drive 126, which receives electricity from a power source 128. The motor lead extension 124 connects to the motor 120 with a pothead connector 130. In some embodiments, the motor 120 includes a motor head 132 and the pothead connector 130 is connected to the motor head 132.

Figure 2:
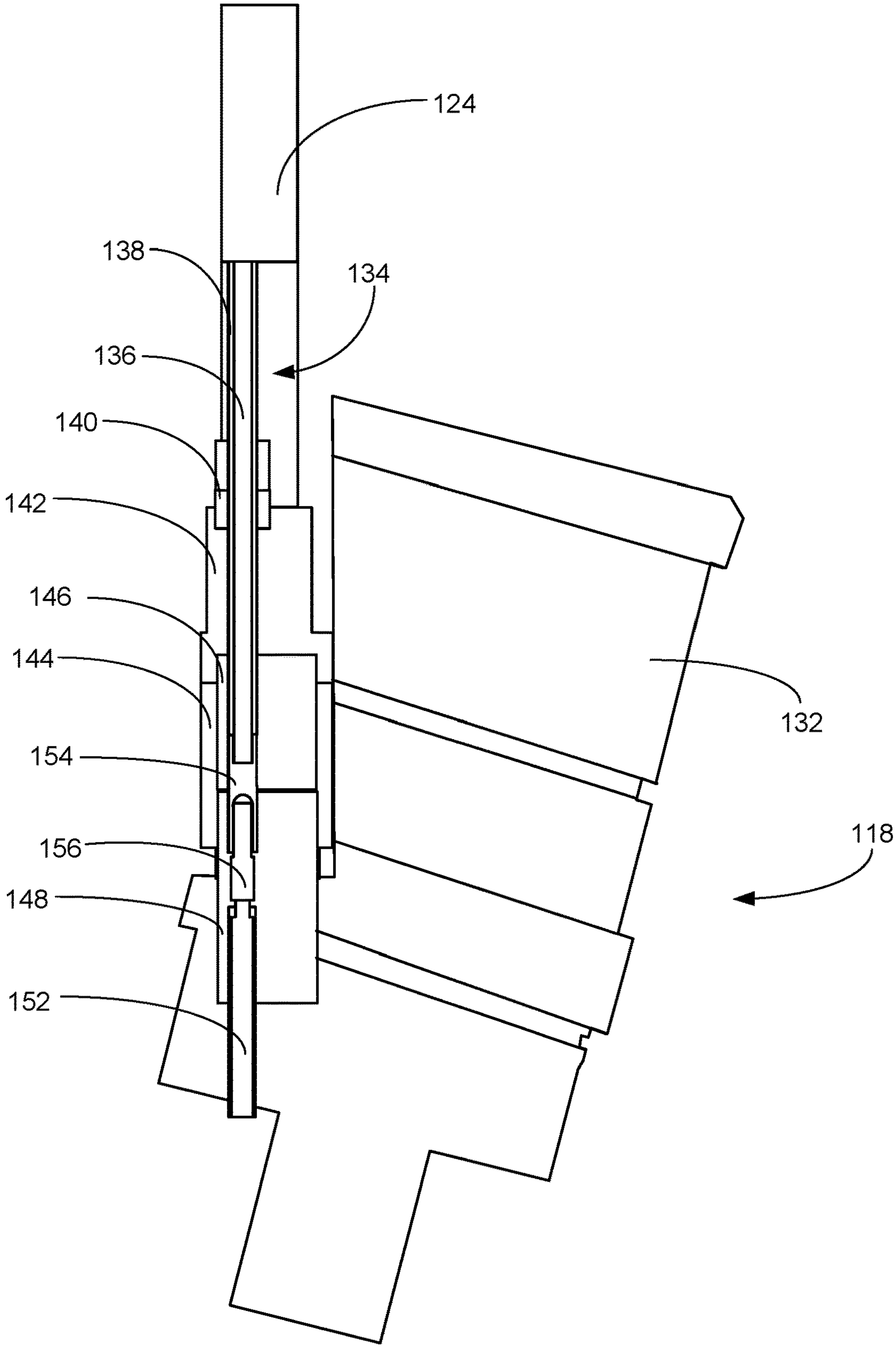
FIG. 2 is a cross-sectional view of a standard pothead-to-motor connection.

Turning to FIG. 2, shown therein is a cross-sectional depiction of the motor head 132, a standard pothead connector 130, and a portion of the motor lead extension 124. The pothead connector 130 is generally configured to provide a sealed connection between the motor lead extension 124 and the motor head 132. The motor lead extension 124 includes a plurality of insulated leads 134 that each include an electrical conductor 136 and a polymer-based insulation layer 138. For most motors 118, each insulated lead 134 corresponds to a distinct phase of electricity.

The insulation layer 138 can be constructed from a variety of electrically inactive polymers that exhibit favorable resistance to water and corrosive downhole chemicals. Suitable polymers include perfluoroalkyl (PFA) polymers. The insulated leads 134 enter the upper end of the pothead connector 130 through a compression fitting 140, that threads into an upper or single housing 142 of the pothead connector 130. Alternatively, the means of sealing out fluid may be via a compression type seal directly against the insulation. The insulated lead 134 extends through the upper housing 142 into a lower housing 144 of the pothead connector 130.

The pothead connector 130 includes a pothead insulator block 146 that extends between the upper and lower housings 142, 144. The insulated lead 134 passes into the pothead insulator block 146. Similarly, the motor head 132 includes a motor insulator block 148 that is partially contained within the motor head 132.

A motor lead 152 extends from the motor windings (not shown) within the motor 118 into the motor head insulator block 148. A conductive terminal 154 extends between the motor head insulator block 148 and the pothead insulator block 146 and provides an electrical connection between the conductor 136 of the insulated lead 134 and the motor lead 152. In some embodiments, the terminal 154 is configured as a female-to-female coupling between the insulated lead 134 and the motor lead 152. In some embodiments, a terminal pin 156 is used to connect the motor lead 152 to the terminal 154. A portion of the insulation layer 138 is removed from the distal end of the conductor 136 to reveal an uninsulated tip 150 of the conductor 136, which can be captured within the terminal 154.

Figure 3:
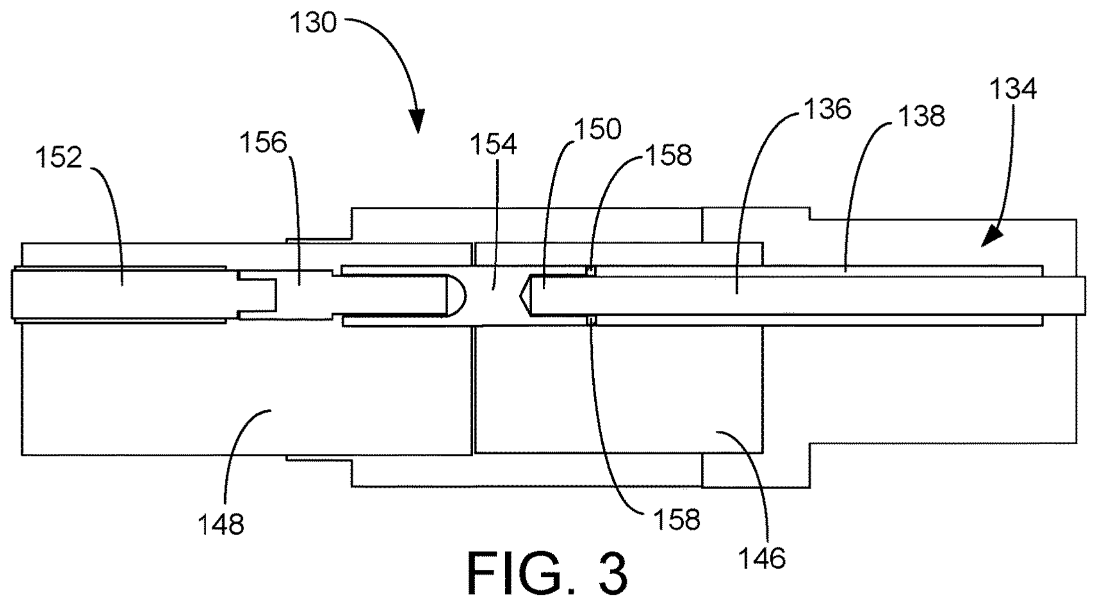
FIG. 3 is a cross-sectional view of a first embodiment of an insulation anchoring system in a typical pothead.

Turning to FIG. 3, shown therein is a close-up cross-sectional view of the pothead connector 130, insulated lead 134, terminal 154 and motor lead 152. In this embodiment, the insulation layer 138 has been welded, fused or otherwise connected to the terminal 154 at bonded joint 158. The welded joint 158 secures the insulation layer 138 to the terminal 154, which prevents the insulation layer 158 from retracting away from the uninsulated tip 150 of the conductor 136. The insulation layer 138 can also, or alternatively, be welded, bonded or otherwise fused directly to the conductor 136 or to both the conductor 136 and the terminal 154.

Figure 4:
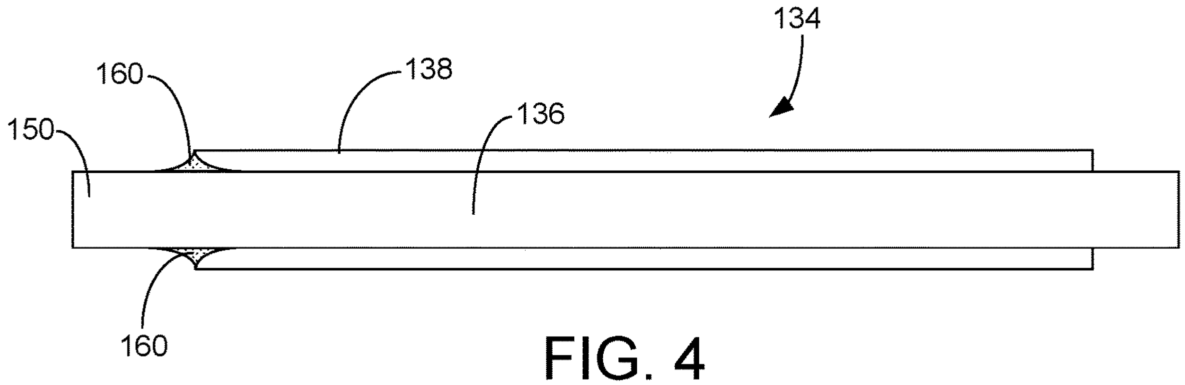
FIG. 4 is a cross-sectional view of a second embodiment of an insulation anchoring system on an insulated conductor.

Turning to FIG. 4, shown therein is an embodiment in which the insulation layer 138 has been secured directly to the conductor 136. In exemplary embodiments, a distal portion 160 of the insulation layer 138 has been chemically bonded to the conductor 136. Suitable solvents or acids can be used to partially "melt" the insulation layer 138, which then re-cures in a state bonded to the conductor 136. Thus, unlike an adhesive, the insulation layer 138 is partially liquefied and then re-cured onto the conductor 136. The bond between the insulation layer 138 and the conductor 136 prevents the insulation layer 138 from retracting away from the uninsulated tip 150 of the conductor 136.

Figure 5:
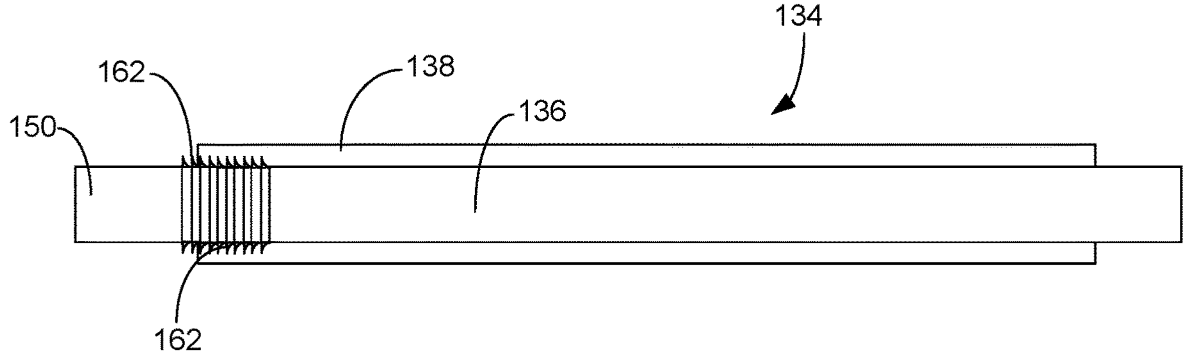
FIG. 5 is a cross-sectional view of a third embodiment of an insulation anchoring system on an insulated conductor.

Turning to FIG. 5, shown therein is another embodiment in which the conductor 136 is provided with frictional structures 162 that engage with the interior of the insulation layer 138. The frictional structures 162 may include barbs, knurling, grooves, ridges, textures, teeth, fins, or other elements that increase the contact resistance between the conductor 136 and the insulation layer 138. The frictional structures 162 can be made integral with the conductor 136 by carving or scoring the conductor 136 to produce the raised frictional structures 162. Alternatively, the frictional structures 162 can be manufactured as a separate element and then affixed to the conductor 136 by mechanical (e.g., crimping), chemical (e.g., adhesives), or fusing (e.g., welding).

Figure 6:
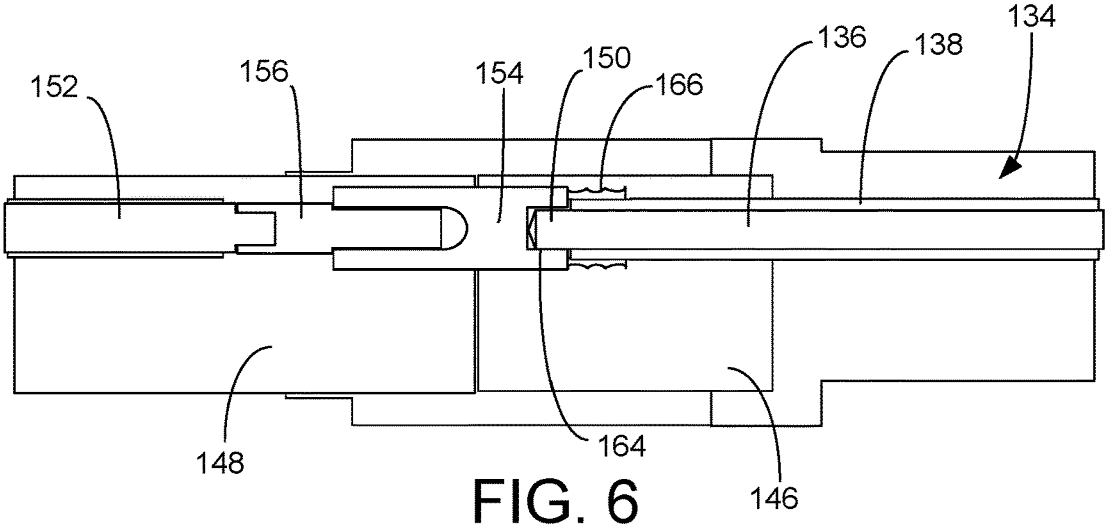
FIG. 6 is a cross-sectional view of a fourth embodiment of an insulation anchoring system in a typical pothead.

Turning to FIG. 6, shown therein is an embodiment in which the terminal 154 includes an inner conductor counterbore 164 that admits the uninsulated tip 150 and an integral or connected outer insulator counterbore 166 that admits a portion of the insulation layer 138. The portion of the terminal 154 around the insulator counterbore 166 has been crimped or otherwise deformed under compression around the insulation layer 138. The engagement between the insulation layer 138 and the insulator counterbore 166 prevents the insulation layer 138 from retracting from the uninsulated tip 150 of the conductor 136.

Figure 7:
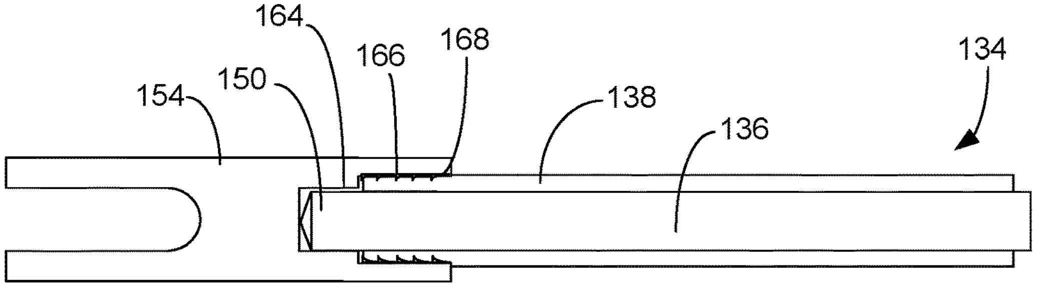
FIG. 7 is a cross-sectional view of a fifth embodiment of an insulation anchoring system between an insulated conductor and the terminal.

A related embodiment is depicted in FIG. 7. In the embodiment depicted in FIG. 7, the insulator counterbore 166 includes pins, teeth or other projections 168 that grip the insulation layer 138. As depicted in FIG. 7, the projections 168 are directional teeth, which permit the insertion of the insulation layer 138 into the insulator counterbore 166, but resist the retraction of the insulated lead 134 from the terminal 154. The directional projections 168 bite into the insulation layer 138, thereby preventing the insulation layer 138 from retracting over the conductor 136.

Figure 8:
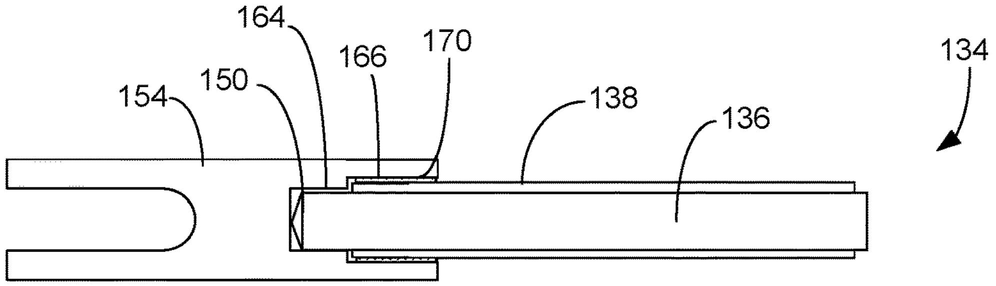
FIG. 8 is a cross-sectional view of a sixth embodiment of an insulation anchoring system between an insulated conductor and the terminal.

FIG. 8 depicts yet another embodiment in which an adhesive layer 170 is placed between the insulation layer 138 and the outer insulator counterbore 166 of the terminal 154. The adhesive layer 170 can be an epoxy or other suitable adhesive that can form a strong bond between the insulation layer 138 and the terminal 154. The adhesive layer 170 can be applied to the insulator counterbore 166 before the insulated lead 134 is inserted into the terminal 154.

Figure 9:
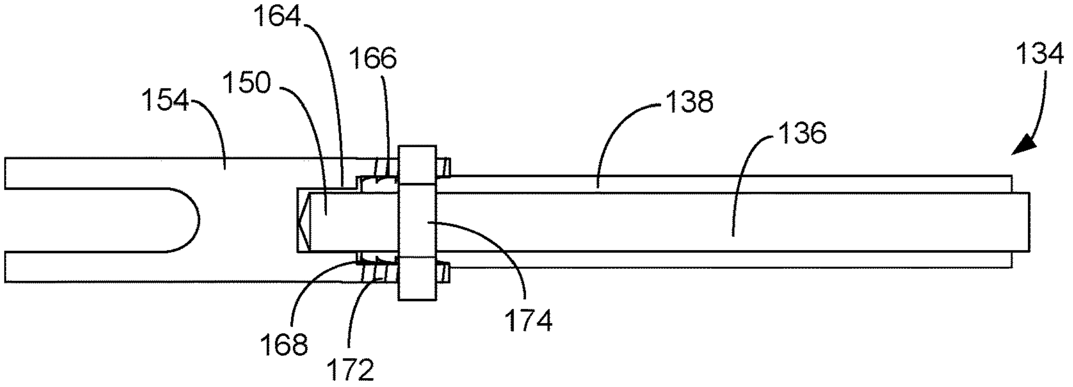
FIG. 9 is a cross-sectional view of a seventh embodiment of an insulation anchoring system between an insulated conductor and the terminal.
Figure 10:
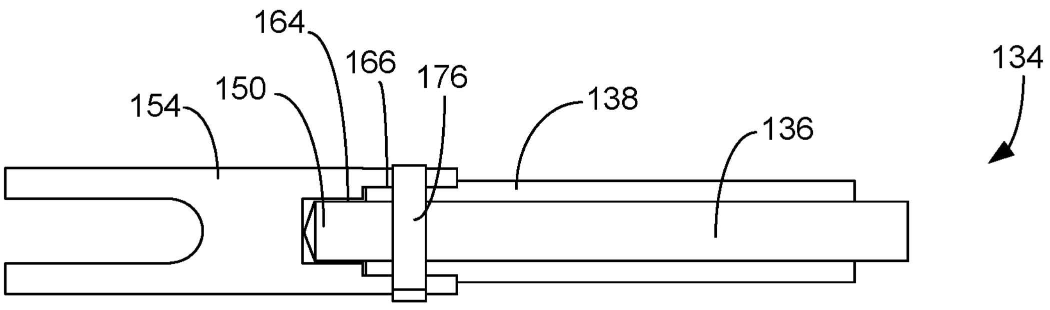
FIG. 10 is a cross-sectional view of an eighth embodiment of an insulation anchoring system between an insulated conductor and the terminal.

In the embodiment depicted in FIG. 9, the outer insulator counterbore 166 includes an external threaded portion 172 configured to receive a ferrule nut 174. Tightening the ferrule nut 174 onto the threaded portion 172 compresses the insulator counterbore 166 around the insulator layer 138. The insulator counterbore 166 can also include projections 168, which further increase the engagement between the terminal 154 and the insulation layer 138. The ferrule nut 174 and insulator counterbore 166 cooperate to prevent the insulation layer 138 from retracting from the conductor 136. FIG. 10 depicts a similar embodiment in which a compression band 176 is disposed around the insulator counterbore 166 to compress the terminal 154 around the insulation layer 138 of the insulated lead 134. In some embodiments, the compression band 176 is a worm gear type clamp, while in other embodiments the compression band 176 is a stepless ear clamp.

Figure 11A:
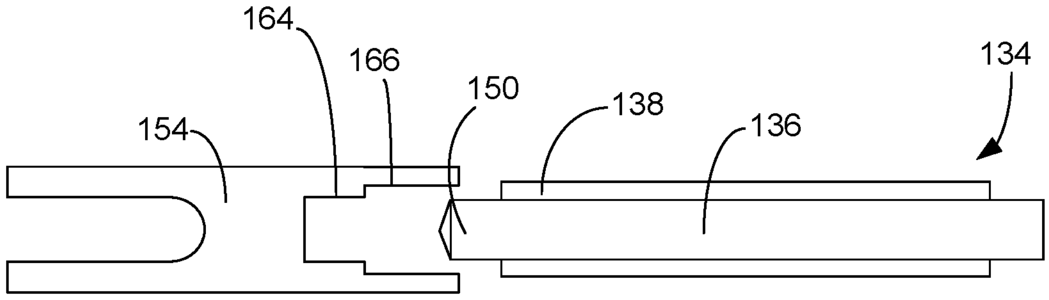
FIG. 11A is a cross-sectional view of a ninth embodiment of an insulation anchoring system between an insulated conductor and the terminal in which the insulated conductor has not yet been approximated into the terminal.
Figure 11B:
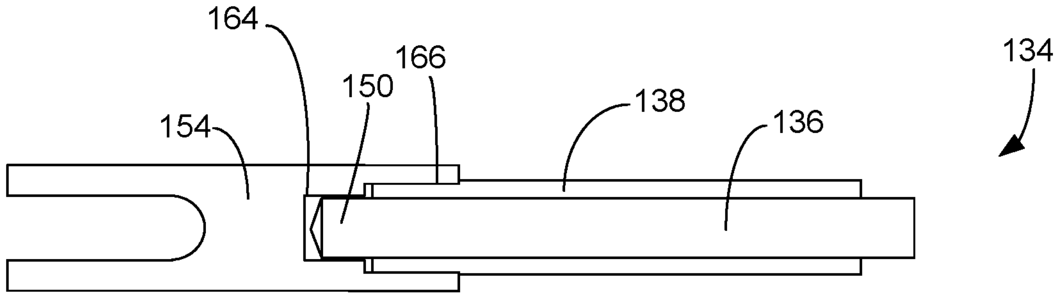
FIG. 11B is a cross-sectional view of the embodiment of FIG. 11A in which the insulated conductor has been approximated with the terminal in a shrink fit or interference fit.

In the embodiment depicted in FIGS. 11A and 11B, the insulator counterbore 166 has been sized such that its internal diameter is slightly smaller than that outer diameter of the insulation layer 138. In this way, when the insulated lead 134 is pressed into the terminal 154, the insulation layer 138 is compressed within the smaller insulator counterbore 166, which creates an interference fit in which the terminal 154 discourages the retraction of the insulation layer 138. In some embodiments, the insertion of the insulated lead 134 into the terminal 154 causes the smaller insulator counterbore 166 to expand radially outward such that the insulator counterbore 166 thereafter applies a compressive force against the insulation layer 138.

Figure 12A:
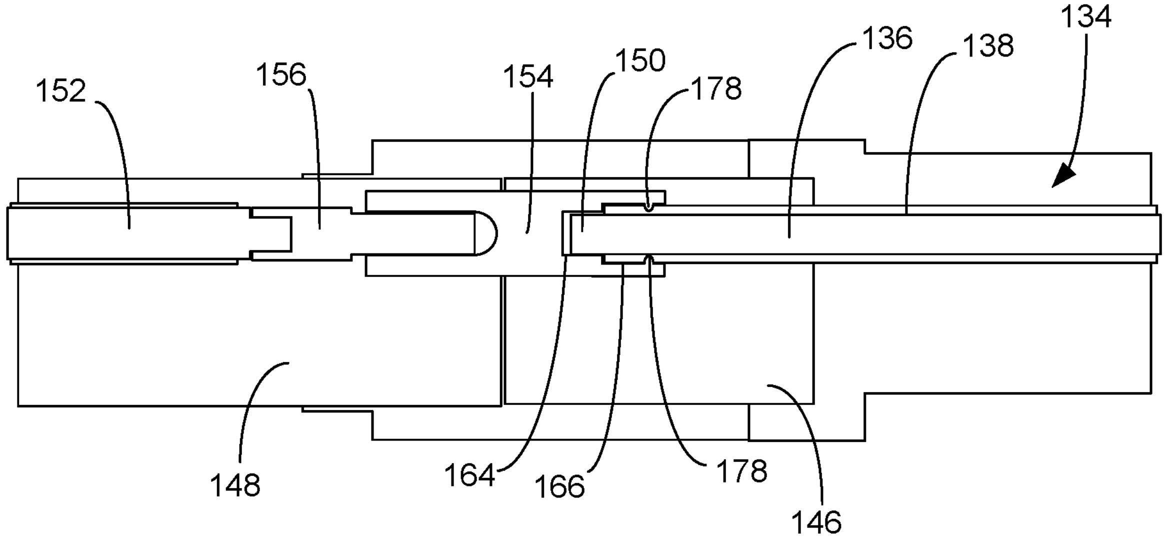
FIG. 12A depicts a cross-sectional view of a tenth embodiment of an insulation anchoring system in a typical pothead.
Figure 12B:
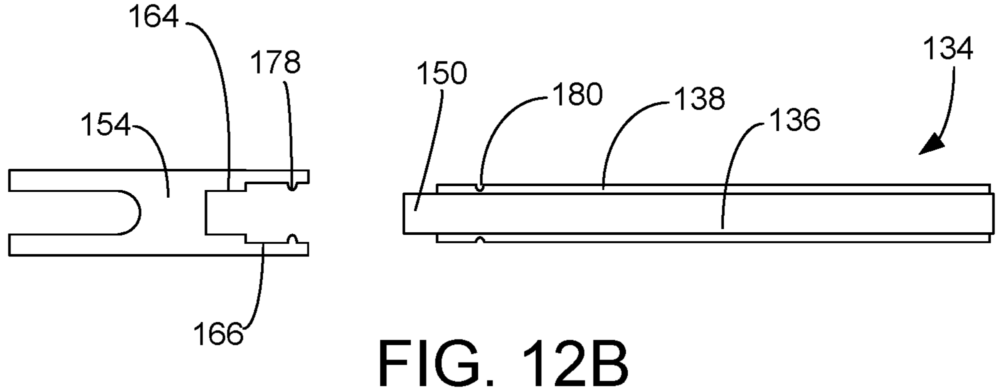
FIG. 12B provides a cross-sectional view of the insulated conductor and terminal from FIG. 12A in a disassembled position.
Figure 12C:
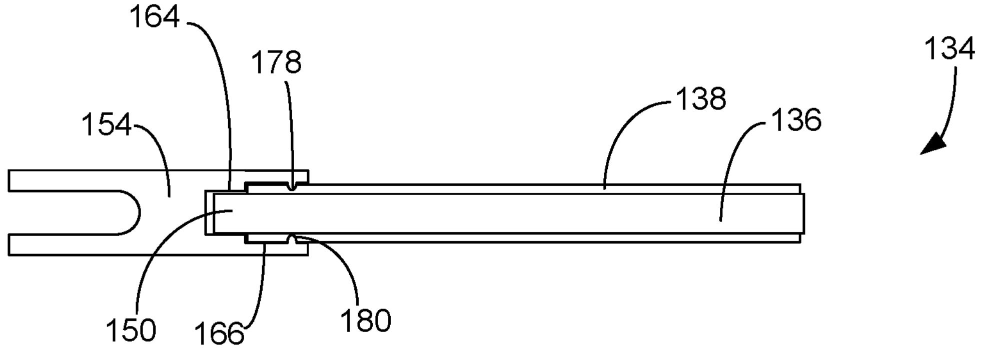
FIG. 12C provides a cross-sectional view of the insulated conductor and terminal from FIG. 12A in an assembled position.
Figure 13A:
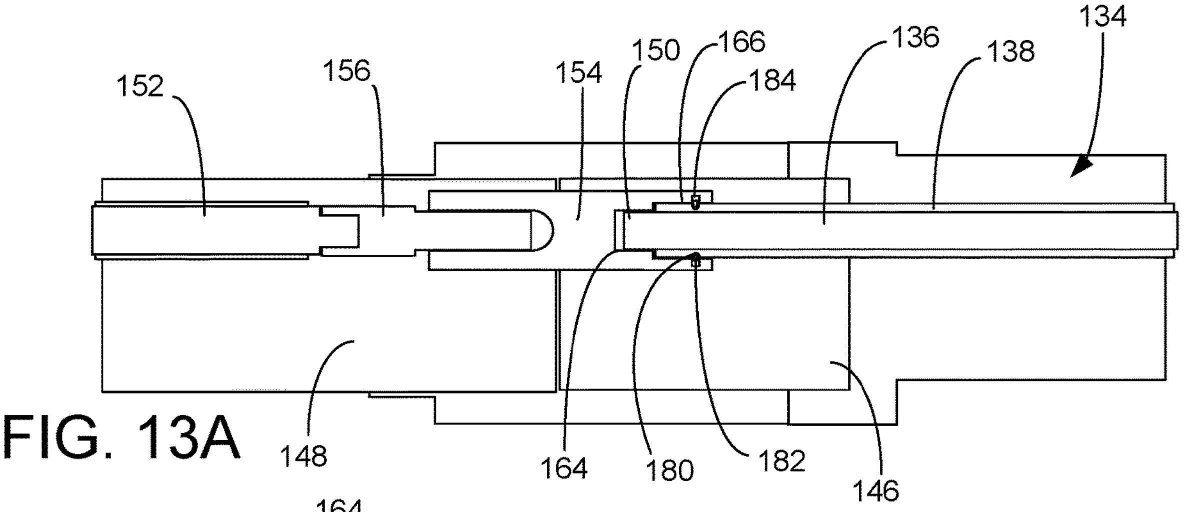
FIG. 13A depicts a cross-sectional view of an eleventh embodiment of an insulation anchoring system in a typical pothead.
Figure 13B:
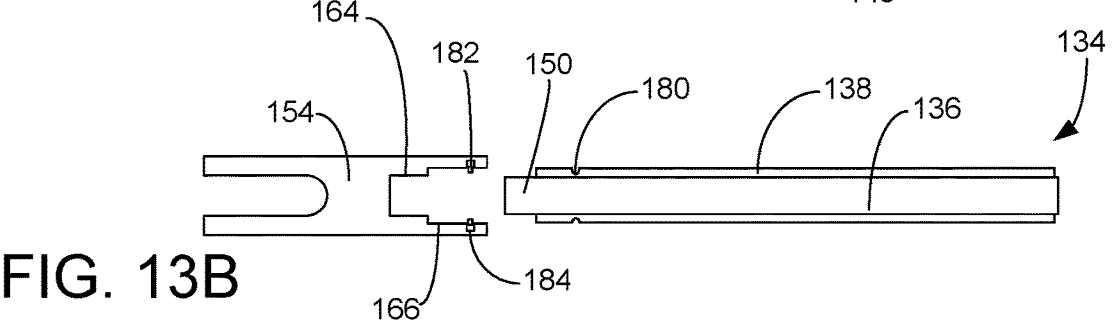
FIG. 13B provides a cross-sectional view of the insulated conductor and terminal from FIG. 13A in a disassembled position.
Figure 13C:
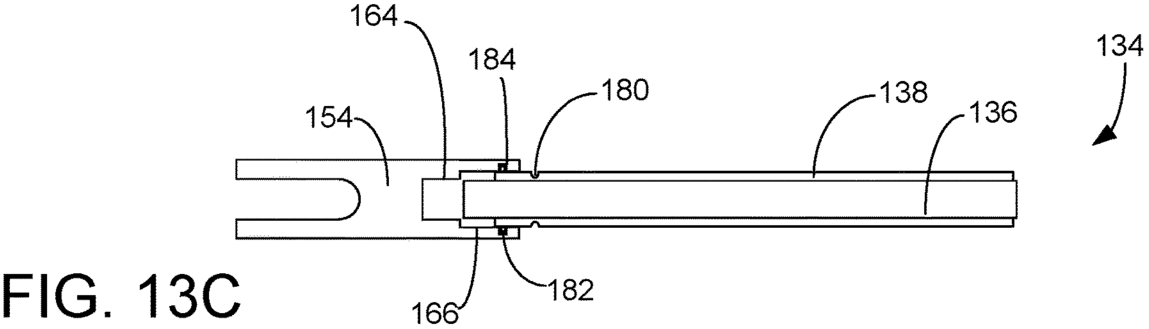
FIG. 13C provides a cross-sectional view of the insulated conductor and terminal from FIG. 13A in an intermediate assembled position.
Figure 13D:
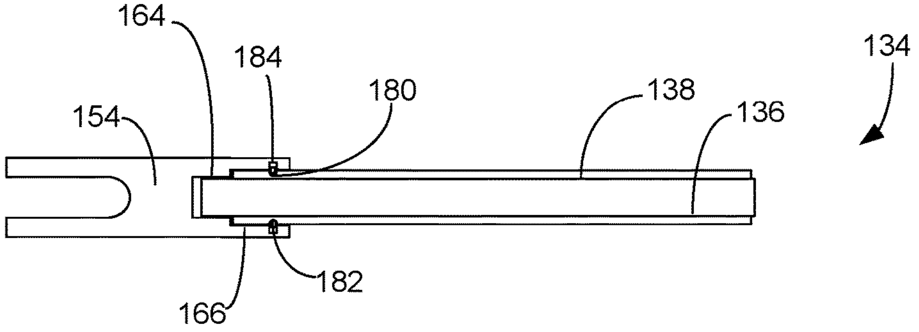
FIG. 13D provides a cross-sectional view of the insulated conductor and terminal from FIG. 13A in a final assembled position.

Turning to FIGS. 12A-12C, shown therein is an embodiment in which the insulator counterbore 166 includes an internal lock ring 178 that is configured to be received within a corresponding circumferential groove 180 on the outside diameter of the insulation layer 138. The circumferential groove 180 can be created by scoring, pressing, or melting the insulation layer 138. The circumferential groove 180 should not extend through the entire thickness of the insulation layer 138 to prevent an unintended electrical short between the conductor 136 and surrounding components.

In exemplary embodiments, the insulator counterbore 166 exhibits a degree of flexibility that permits the outward radial deflection of the internal lock ring 178 as the insulation layer 138 passes into the terminal 154. Once the circumferential groove 180 passes beneath the internal lock ring 178, the spring force of the terminal 154 forces the internal lock ring 178 into the circumferential groove 180 (as depicted in FIG. 12C). The engagement between the internal lock ring 178 and circumferential groove 180 in the insulation layer 138 opposes the axial retraction of the insulation layer 138 away from the uninsulated tip 150 of the conductor 136.

In a related embodiment depicted in FIGS. 13A-13D, the terminal 154 includes a spring-retractable ring 182 within the insulator counterbore 166. The spring-retractable ring 182 can be deployed radially inward into a ring recess 184 in the insulator counterbore 166. As the insulation layer 138 passes under the spring-retractable ring 182 as the insulated lead 134 is inserted into the terminal 154, the spring-retractable ring 182 is compressed into a retracted position. When the circumferential groove 180 passes under the expanded spring-retractable ring 182, the spring force of the compressed spring-retractable ring 182 forces the spring-retractable ring 182 into the circumferential groove 180. The engagement between the spring-retractable ring 182 and the circumferential groove 180 prevents the insulation layer 138 from retracting away from the uninsulated tip 150 of the conductor 136.

In alternate embodiments, the spring-retractable ring 182 is replaced by discrete spring-loaded tabs or buttons, which are configured to deploy into corresponding holes or voids in the outside of the insulation layer 138. In these embodiments, the engagement between the spring-loaded tabs and the corresponding voids in the insulation layer 138 prevents the insulated lead 134 from rotating with respect to the terminal 154.

Thus, embodiments disclosed herein are generally directed to insulation lock mechanisms for preventing the retraction of the insulation layer 138 from the conductor 136. The insulation lock mechanisms can be located between the conductor 136 and the insulation layer 138, or between the insulation layer 138 and the terminal 154 or other surrounding structure. The insulation lock can by mechanical (e.g., crimping, teeth and other frictional projections), chemical (e.g., adhesives), fusing (e.g., welding) or a combination of two or more of the mechanical, chemical, and fusing mechanisms.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

For example, the same mechanisms used to prevent the retraction of the insulation layer 138 on the insulated lead 134 can be used to prevent the retraction of insulation surrounding the conductor of the motor leads 152. It will further be appreciated that mechanisms for preventing the retraction of the insulation layer 138 disclosed in one embodiment can be used in cooperative combination with mechanisms disclosed in another embodiment. For example, it may be desirable to combine the frictional structures 162 between the conductor 136 and insulation layer 138 with a compression band 176 that forces projections 168 in the terminal into the insulation layer 138.

What is claimed is:

1. A pumping system for use in recovering wellbore fluids from a wellbore, the pumping system comprising:

an electric motor, wherein the motor comprises a motor lead;

a motor lead cable, wherein the motor lead cable comprises an insulated lead that includes a conductor and an insulation layer surrounding part of the conductor;

a pothead connector between the motor and the motor lead cable, wherein the pothead connector comprises a terminal that electrically connects the motor lead to the insulated lead of the motor lead cable; and a mechanism for preventing the retraction of the insulation layer from the conductor on the insulated lead, wherein the mechanism comprises frictional structures on the conductor that engage the insulation layer of the insulated lead, wherein the frictional structures are selected from the group consisting of barbs, knurling, projections, grooves, ridges, textures, teeth, and fins.

2. A pumping system for use in recovering wellbore fluids from a wellbore, the pumping system comprising:

an electric motor, wherein the motor comprises a motor lead;

a motor lead cable, wherein the motor lead cable comprises an insulated lead that includes a conductor and an insulation layer surrounding part of the conductor;

a pothead connector between the motor and the motor lead cable, wherein the pothead connector comprises an electrically conductive terminal that electrically connects the motor lead to the insulated lead of the motor lead cable, wherein the electrically conductive terminal comprises:

an inner conductor counterbore configured to receive an uninsulated tip of the conductor; and an outer insulator counterbore configured to receive the insulation layer of the insulated conductor; and a mechanism for preventing the retraction of the insulation layer from the conductor on the insulated lead.

3. The pumping system of claim 2, wherein the mechanism comprises a crimped connection between the outer insulator counterbore and the insulation layer.

4. The pumping system of claim 2, wherein the mechanism comprises one or more projections extending from the outer insulator counterbore to the insulation layer, wherein the one or more projections comprise pins or directional teeth.

5. The pumping system of claim 2, wherein the mechanism comprises an adhesive layer between the outer insulator counterbore and the insulation layer.

6. The pumping system of claim 2, wherein the outer insulator counterbore comprises:

an external threaded portion; and a ferrule nut that engages the external threaded portion to exert a compressive force between the outer insulator counterbore and the insulation layer.

7. The pumping system of claim 2, wherein the outer insulator counterbore comprises a compression band exerts a compressive force between the outer insulator counterbore and the insulation layer.

8. The pumping system of claim 2, wherein the outer insulator counterbore comprises an adhesive layer between the outer insulator counterbore and the insulation layer.

9. The pumping system of claim 2, wherein the outer insulator counterbore has an inner diameter that is nominally smaller than the outer diameter of the insulation layer to produce an interference fit between the outer insulator counterbore and the insulation layer.

10. The pumping system of claim 2, wherein the outer insulator counterbore comprises an internal lock ring that is captured within a circumferential groove in the insulation layer.

11. A connector for connecting a motor lead to an insulated lead, where the insulated lead includes a conductor, an insulation layer surrounding a part of the conductor, and an uninsulated tip in which the conductor is not surrounded by the insulation layer, the connector comprising:

a terminal that electrically connects the motor lead to the conductor of the insulated lead, wherein the terminal comprises:

an inner conductor counterbore configured to receive the uninsulated tip of the insulated lead;

an outer insulator counterbore configured to receive a portion of the insulation layer of the insulated lead; and an insulation lock within the outer insulator counterbore for preventing the retraction of the insulation layer from the conductor on the insulated lead, wherein the insulation lock comprises one or more projections extending from the outer insulator counterbore into to the insulation layer.

12. A connector for connecting a motor lead to an insulated lead, where the insulated lead includes a conductor, an insulation layer surrounding a part of the conductor, and an uninsulated tip in which the conductor is not surrounded by the insulation layer, the connector comprising:

an electrically conductive terminal that electrically connects the motor lead to the conductor of the insulated lead, wherein the electrically conductive terminal comprises:

an inner conductor counterbore configured to receive the uninsulated tip of the insulated lead;

an outer insulator counterbore configured to receive a portion of the insulation layer of the insulated lead; and an insulation lock within the outer insulator counterbore for preventing the retraction of the insulation layer from the conductor on the insulated lead, wherein the insulation lock comprises a crimped connection between the outer insulator counterbore and the insulation layer.

13. A connector for connecting a motor lead to an insulated lead, where the insulated lead includes a conductor, an insulation layer surrounding a part of the conductor, and an uninsulated tip in which the conductor is not surrounded by the insulation layer, the connector comprising:

a terminal that electrically connects the motor lead to the conductor of the insulated lead, wherein the terminal comprises:

an inner conductor counterbore configured to receive the uninsulated tip of the insulated lead;

an outer insulator counterbore configured to receive a portion of the insulation layer of the insulated lead; and an insulation lock within the outer insulator counterbore for preventing the retraction of the insulation layer from the conductor on the insulated lead, wherein the insulation lock comprises an internal lock ring that is captured within a circumferential groove in the insulation layer.

14. A connector for connecting a motor lead to an insulated lead, where the insulated lead includes a conductor, an insulation layer surrounding a part of the conductor, and an uninsulated tip in which the conductor is not surrounded by the insulation layer, the connector comprising:

a terminal that electrically connects the motor lead to the conductor of the insulated lead, wherein the terminal comprises:

an inner conductor counterbore configured to receive the uninsulated tip of the insulated lead;

an outer insulator counterbore configured to receive a portion of the insulation layer of the insulated lead; and an insulation lock within the outer insulator counterbore for preventing the retraction of the insulation layer from the conductor on the insulated lead, wherein the insulation lock comprises:

a ring recess; and a spring-retractable ring inside ring recess, wherein the spring-retractable ring is configured to be captured within a circumferential groove in the insulation layer.

15. An insulated lead that includes a conductor and an insulation layer surrounding part of the conductor, the insulated lead further comprising an insulation lock configured to prevent the retraction of the insulation layer from the conductor, wherein the insulation lock comprises frictional structures on the conductor that engage the insulation layer of the insulated lead, wherein the frictional structures are selected from the group consisting of barbs, knurling, projections, grooves, ridges, textures, teeth, and fins.

* * * * *